United States Patent [19]

Ishida

[11] 3,947,858
[45] Mar. 30, 1976

[54] ELECTROMAGNETIC CONTROL DEVICE FOR ELECTRONIC SHUTTER
[75] Inventor: Hiroaki Ishida, Yotsukaido, Japan
[73] Assignee: Seiko Koki Kabushiki Kaisha, Japan
[22] Filed: Oct. 10, 1974
[21] Appl. No.: 513,855

[30] Foreign Application Priority Data
Oct. 11, 1973 Japan............................ 48-118208[U]

[52] U.S. Cl. .................. 354/234; 354/50; 354/258; 354/268
[51] Int. Cl.² ........................ G03B 9/08; G03B 17/38
[58] Field of Search ........................... 354/234-235, 354/258, 266, 268, 48, 50, 51

[56] References Cited
UNITED STATES PATENTS
3,722,391   3/1973   Kitai ................................. 354/258
3,774,514   11/1973  Okamoto et al. ................ 354/204 X Primary Examiner—Richard M. Sheer
Assistant Examiner—James LaBarre
Attorney, Agent, or Firm—Robert E. Burns; Emmanuel J. Lobato; Bruce L. Adams

[57] ABSTRACT

An electronic camera shutter having a single spring that biases an armature lever in a direction for applying an electromagnet armature supported thereon against the electromagnet until the electromagnet, which is a part of an exposure time control circuit, is energized so that the armature is attracted. This same spring cooperates with a holding lever biasing it in a direction for engaging with the armature lever and driving it in a direction for separating the armature from the electromagnet to initiate closing of the shutter upon de-energization of the electromagnet at the end of the exposure time period controlled by the exposure time control circuit. A release lever for taking exposures has a rest position in which it holds the holding lever against the action of the spring upon actuation of the release lever the holding lever is released but the exposure time control circuit is closed by actuation of the release lever so that the electromagnet is energized and the armature is held in an attracted condition. This precludes driving of the armature lever by the holding lever although the holding lever has been released by the release lever. Upon completion of the exposure time the armature is released and the single spring drives the holding lever which separates the armature from the electromagnet and initiates closing of the shutter with the armature lever. The shutter has a safety device in that the release lever is provided with a lateral notch into which a projection on the holding lever is insertable to preclude complete actuation of the release lever to preclude taking of an exposure in the event that the electromagnet is not completely energized and in which case the holding lever is immediately released when the release lever is actuated.

4 Claims, 4 Drawing Figures

ELECTROMAGNETIC CONTROL DEVICE FOR ELECTRONIC SHUTTER

BACKGROUND OF THE INVENTION

The present invention relates to an electronic shutter for a camera having an electromagnet which is controlled for terminating the exposures by an exposure control circuit by means of which the shutter will be closed.

In such a type of electronic shutter the electromagnet is finished actuating the shutter at the time of completion of an exposure as described above, it must be provided with a means for holding an armature lever to the electromagnet before actuation of the electromagnet and of making it move apart from the electromagnet after completion of its actuation. The armature lever must thus be imparted actuations contrary to each other before and after actuation of the electromagnet. To assist that, therefore, the electromagnet should be actuated first by a release operation thereby allowing the armature lever to be attracted thereto and the holding lever should be made to part from the armature lever in the next step of the release operation. Accordingly, the electric shutter provided with both an armature lever and holding lever as set forth above have had to have different springs for each of them.

SUMMARY OF THE INVENTION

The present invention referrable to an electronic shutter provided with an armature lever and holding lever as mentioned above is intended to provide an electronic shutter for a camera such that each of the armature lever and holding lever is devised to perform its required actuation by means of the movable end of a single spring fitted between the respective levers.

DESCRIPTION OF THE PREFERRED EMBODIMENTS

Figure 1:
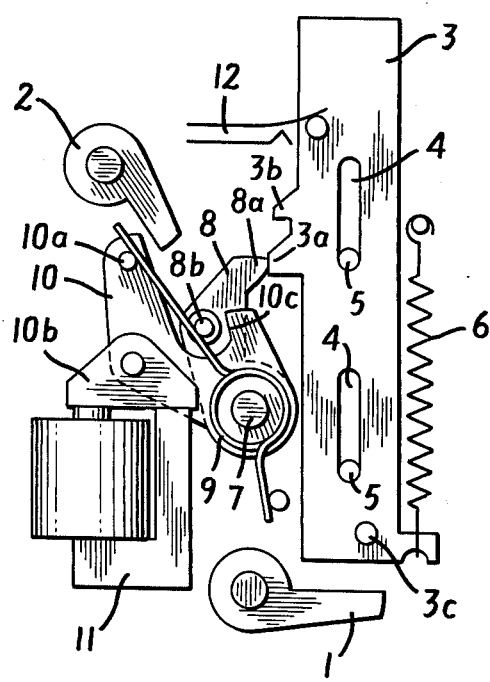
FIG. 1 is a plan view showing an embodiment of a shutter provided with the present invention.
Figure 2:
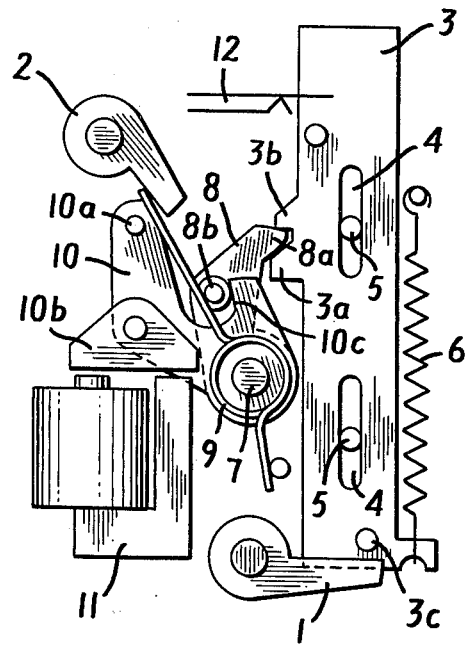
FIG. 2 is a plan view showing the state of hindering release of the shutter in FIG. 1.
Figure 3:
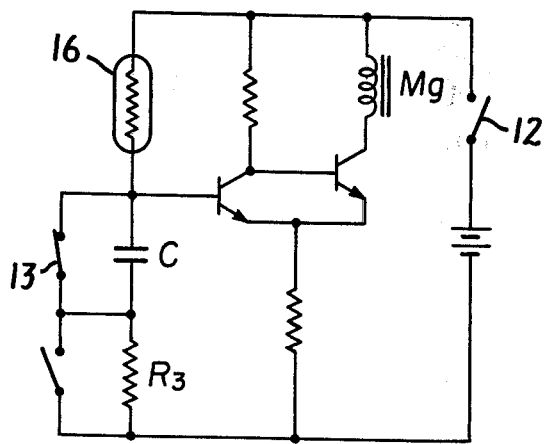
FIG. 3 is a schematic of an exposure time control circuit.

An explanation is made below according to the embodiment as shown. FIG. 1 and FIG. 2 are views of one embodiment of a shutter control device provided with the present invention and it can be actuated by the exposure control circuit as shown in FIG. 3. A detailed description of the circuit is omitted as it is well-known. It is an embodiment of an exposure control circuit including a detection circuit for alarming of the condition of a high brightness range by means of a light receiving element 16 and a comparison resistor R3.

In explaining FIG. 1, 1 shows an open lever for activating shutter blades to open them. 2 shows a close lever for closing the shutter blades, not shown. 3 is a release member for a shutter supported on a base plate with long slots 4 for guidance on pins 5, and is continuously being pulled or biased upwardly by a compression spring 6 the upper end of which is firmly fixed on the base plate. A holding lever 8 is pivoted on a fixed shaft 7, on which a first protusion 3a of the release member 3 and a protusion 8a of the holding lever 8 join in contact. The holding lever 8 has a pin 8b set on it urging a biasing spring 9 in a counterclockwise direction. An armature lever 10 with a pin 10a and a movable armature 10b is pivoted on a fixed shaft 7, and the movable end of the spring 9 in a charged state presses against the pin 10a of the armature lever 10 under pressure, through which the armature lever 10 has exerted thereon a force in a counterclockwise direction and the movable armature 10b is held against an electromagnet 11. Releasing of the shutter is accomplished by depressing the release lever or member 3. The release member 3 first closes a power supply switch 12 and thus energizes the electromagnet 11. Then, the protusion 8a of the holding lever 8 being subjected to the force of the biasing spring 9 is taken off from the first protusion 3a of the release member 3.

A large radius part of the pin 8b of the holding lever 8 contacts with a notched part 10c of the armature lever 10 and can turn clockwise no further because the armature lever 10 is then being attracted by the electromagnet 11. Since the touching part or protusion 8a of the holding lever 8 does not lock with the second protusion 3b which is slightly shorter then the first protusion 3a of the release member 3, the release member 3 descends further, and causes the opening lever 1 to turn clockwise by pin 3c and opens the shutter blades. Then, it stops energization of the electromagnet by means of the aforesaid exposure time control circuit, while the armature lever 10 turns by spring 9 through holding lever 8 clockwise and closes the shutter by actuating the closing lever 2 counterclockwise. The release member 3 rises and is restored by eliminating of the state of its being pressed, whereby the holding lever 8 is made to turn counterclockwise, armature lever 10 is allowed to turn counterclockwise through biasing spring 9 and the movable armature 10b is held to the electromagnet 11.

Figure 4:
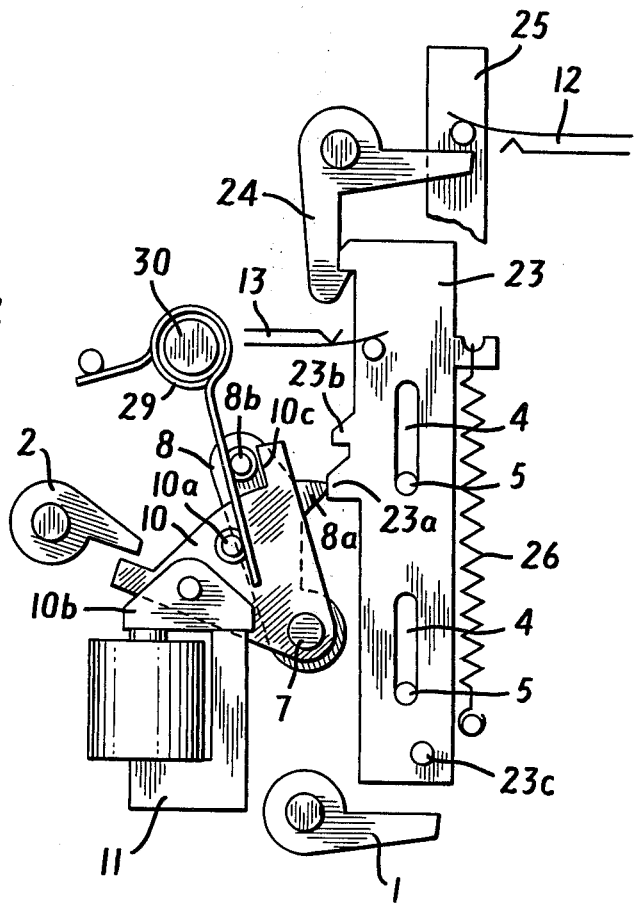
FIG. 4 is another embodiment of a shutter according to the present invention.

The actions of what has been mentioned above are relevant to where the electromagnet works normally or effects an appropriate exposure and when the power supply has its required voltage. However, if the electromagnet fails to work under control of the afore-mentioned detection circuit and if power voltage is insufficient, the electromagnet 11 does not attract the armature lever 10, by reason of which the first protusion 3a of the release member 3 turns the holding lever 8 clockwise by the biasing spring 9 as it passes over the contacting part 8a of the holding lever 8 as shown in FIG. 2, and the large radius part of the pin 8b contacts with the notched part 10c of the armature lever 10, thus the holding lever 8 turns further clockwise. The contacting projection part 8a of the holding lever 8 locks the second protusion 3b of the release member 3 thereby prevents the relese member 3 from descending. As a result, the activating pin 3c of the release member 3 does not turn the opening lever 1 clockwise, consequently the shutter will not open. As compared with those shown in FIG. 1 and FIG. 2, the embodiment as shown in FIG. 4 is composed of a forward-travelling or axially travelling member 23 in lieu of a release member, a release button 25 and a locking pawl 24 are provided, and a spring 29 mounted on a spring-hook shaft 30 is provided separate from shaft 7, and the other actions of this embodiment are the same as the embodiment shown in FIG. 1 and FIG. 2.

According to the present invention as mentioned above, separating the armature lever apart from the electromagnet during the release operation and when exposure time is finished and pushing it on to electromagnet before the release operation of the shutter can be carried out by only a single spring fitted between the holding lever and the armature lever.

This can save one spring, which leads to savings of not only the number of parts, space and the quantity of man-hours for assembling, etc. but also the friction due to slipping provided that respective levers can be installed on the same shaft. Since it is not necessary to charge the spring for pulling apart when in release operation, the amount of working force is made lighter, thereby achieving most stable actuation, which can better practical effects in a shutter for a camera requiring high accuracy.

I claim:

1. In an electronic camera shutter, an electromagnet for closing the shutter upon termination of the exposure time and de-energization thereof, an exposure time control circuit for energizing the electromagnet and the de-energizing thereof upon termination of the exposure time determined by said exposure time control circuit, a movable release lever cooperative with said exposure control circuit actuatable for initiating energization of said electromagnet and initiating opening of the shutter for taking an exposure, means biasing said release lever to a rest position, an electromagnet armature engagable with said electromagnet, an armature lever pivotally mounted supporting said armature, a holding lever engagable with said armature lever and cooperative with said release lever in said rest position to preclude said armature lever from separating said electromagnet armature from said electromagnet, a single spring intermediate the holding lever and the armature lever and coactive therewith constantly biasing the holding lever in a direction for engaging with said armature lever and driving it in a direction for separating said armature from said electromagnet for initiating closing of the shutter by actuation of said armature lever in said direction, said release lever having a part bearing on said holding lever holding said holding lever against the biasing of said spring while in the rest position of said release lever, a part of said holding lever biasing the spring in a direction for biasing the armature lever in a direction for applying said armature to said electromagnet when said release lever is in said rest position means for closing the exposure time control circuit when the release lever is actuated, whereby upon actuation of said release lever said exposure time control circuit is energized and the electromagnet is energized to retain said armature attracted thereto and said holding lever is released for driving said armature lever for separating said armature from said electromagnet when said electromagnet is deenergized unde control of said exposure time control circuit.

2. In an electronic camera shutter according to claim 1, including a closing lever for closing the shutter activated by said armature lever when driven by said holding lever.

3. In an electronic camera shutter according to claim 2, including an opening lever actuated by said release lever for opening the shutter.

4. In an electronic camera shutter according to claim 3, in which said release lever comprises a lateral notch, and in which said holding lever comprises a projection insertable into said notch under control of said biasing spring when the release lever is actuated and the holding lever is released thereby and said electromagnet is not energized sufficiently to attract said armature for holding said armature lever in position for precluding release of said holding lever until said exposure time expires.

* * * * *